(12) United States Patent
Kondo (10) Patent No.: US 8,237,905 B2
(45) Date of Patent: Aug. 7, 2012

(54) ELECTRO-OPTICAL DEVICE AND ELECTRONIC APPARATUS

(75) Inventor: Masahiko Kondo, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 77 days.

(21) Appl. No.: 12/243,188

(22) Filed: Oct. 1, 2008

(65) Prior Publication Data

US 2009/0091701 A1    Apr. 9, 2009

(30) Foreign Application Priority Data

Oct. 4, 2007 (JP) ................. 2007-260996

(51) Int. Cl.
*G02F 1/1339* (2006.01)

(52) U.S. Cl. ....................... 349/153; 349/155

(58) Field of Classification Search ........... 349/153–154
See application file for complete search history.

(56) References Cited

U.S. PATENT DOCUMENTS 6,636,192 B1 * 10/2003 Saitoh ........................ 345/87
7,042,546 B2 * 5/2006 Tamashiro et al. ........... 349/190
7,333,167 B2 * 2/2008 Kawase ........................ 349/106
2005/0157520 A1 * 7/2005 Chuang et al. ................ 362/632

FOREIGN PATENT DOCUMENTS

| JP | 05-346562 A | 12/1993 |
| JP | 10-020265 A | 1/1998 |
| JP | 11-095231 | 4/1999 |
| JP | 2004-151343 | 5/2004 |
| JP | 2005-181514 | 7/2005 |
| JP | 2007-047507 | 2/2007 |
| WO | 9816867 | 4/1998 |

* cited by examiner

*Primary Examiner* — Eric Wong
(74) *Attorney, Agent, or Firm* — Maschoff Gilmore & Israelsen (57) ABSTRACT

An electro-optical device includes a pair of first and second substrates. A pixel region on the first substrate. A seal material arranged along the periphery of the pixel region. An alignment mark located between the outer edge side of the second substrate and the seal material, The alignment mark is provided in at least one of four corner regions partially defined by four corners of the second substrate, and is used during alignment of the first and second substrates.

14 Claims, 9 Drawing Sheets

ELECTRO-OPTICAL DEVICE AND ELECTRONIC APPARATUS

BACKGROUND

1. Technical Field

The present invention relates to an electro-optical device such as a liquid crystal device and an electronic apparatus including the electro-optical device, such as a liquid crystal projector.

2. Related Art

As disclosed in JP-A-2005-181514, WO98/16867 and JP-A-2004-151343, an electro-optical device includes a pair of substrates bonded to each other by a seal material and an electro-optical material such as liquid crystal sandwiched between the substrates. Here, the seal material is arranged in a seal region along the periphery of a pixel region (or a pixel array region) in which a plurality of pixels are arranged. An alignment mark for aligning the pair of substrates at the time of the manufacture of the electro-optical device is provided in a predetermined region located on the inside (the pixel region side when viewed from the seal region) of the seal region of the substrates (see JP-A-2004-151343).

In order to downsize such an electro-optical device and realize high quality, a peripheral region located at the periphery of the pixel region of the substrates needs to narrow. However, in the case where the alignment mark is provided inside the seal region of the substrates, the peripheral region located on the inside of the seal region needs to widen by relatively narrowing the pixel region by the size of the alignment mark. Thus, it is difficult to narrow the peripheral region.

SUMMARY

An advantage of some aspects of the invention is that it provides an electro-optical device, which is capable of realizing downsizing and performing a high-quality image display, and an electronic apparatus including the electro-optical device.

According to an aspect of the invention, there is provided an electro-optical device including: a pair of first and second substrates which face each other; a plurality of pixel electrodes arranged on the first substrate; a seal material which is arranged along the periphery of a pixel region, in which the plurality of pixel electrodes are arranged, and bonds the first and second substrates; an alignment mark which is positioned at the outer edge side of the second substrate rather than a seal region, in which the seal material is positioned, is provided in at least one of four corner regions partially defined by four corners of the second substrate, and aligns the first and second substrates, in the first and second substrates.

In the electro-optical device of the invention, the seal material for bonding the pair of first and second substrates is provided in the seal region of the peripheral region located at the periphery of a pixel region or a pixel array region (or called an image display region) in which the plurality of pixel electrodes are arranged. The liquid crystal is filled in the region surrounded by the seal material between the first and second substrates as the electro-optical material.

According to the electro-optical device of the invention, the alignment state of the electro-optical material such as the liquid crystal is controlled by the potentials of the pixel electrodes at the time of the operation thereof. Accordingly, an image display of the pixel region is performed.

In the invention, the alignment mark is provided in the first and second substrates. The alignment mark is a mark or an indication for aligning the first and second substrates when the first and second substrates are bonded by the seal material in the process of manufacturing the electro-optical device and is provided on the first and second substrates so as to form a pair.

In the invention, in particular, the alignment mark is positioned at the outer edge side of the second substrate rather than the seal region in which the seal material is provided, in the first and second substrates and is provided in at least one of the four corner regions partially defined by four corners of the second substrate. The corner regions are positioned at the corner of the second substrate and are positioned on the outside of the seal region (that is, the corner sides of the second substrate when viewed from the seal region). In other words, the corner regions are the so-called dead spaces in which the seal material is not provided (that is, which does not become the seal region) since it is difficult to completely arrange the seal material along the outer edge of the second substrate when the seal material is provided so as to surround the pixel region.

Accordingly, according to the electro-optical device of the invention, since the alignment mark is provided in the corner regions which are the so-called dead spaces, the region for providing only the alignment mark does not need to be ensured in the peripheral region and thus the peripheral region can narrow. For example, compared with the case where the alignment mark is provided in a region located inside the seal region, the pixel region surrounded by the seal region is increased or the region located inside the seal region in the peripheral region can narrow.

Accordingly, according to the liquid crystal device of the invention, the peripheral region of the liquid crystal device narrows with respect to the image display region and thus the liquid crystal device can be downsized without narrowing the image display region. That is, a high-quality image display can be performed and the liquid crystal device can be downsized. In particular, by this configuration, in a general manufacturing process of bonding a first mother substrate which becomes a plurality of first substrates and a second mother substrate which becomes a plurality of second substrates so as to form a plurality of liquid crystal devices and separately cutting the liquid crystal devices, more liquid crystal devices can be formed in the same area. In the case where several or several tens of liquid crystal devices are manufactured on the same mother substrate, for example, if the sizes of the first and second substrates are slightly reduced by several tenths mm or several mm, more liquid crystal devices can be formed on the same mother substrate by one column or a plurality of columns or one row or a plurality of rows. Accordingly, the significant effect can be obtained by slightly reducing the sizes of the first and second substrates.

As described above, according to the liquid crystal device of the invention, since the alignment marks are provided in the corner regions, it is possible to perform a high-quality image display and downsize the liquid crystal device.

The electro-optical device may further include a first conductive terminal which is provided in a corner region different from the corner region, in which the alignment mark is provided, among the four corner regions of the first substrate, and makes the first and second substrate conductive.

According to this configuration, it is possible to arrange the alignment mark and the first conductive terminal on the first substrate with narrowing the peripheral region. Alternatively, it is possible to arrange the alignment mark and the first conductive terminal on the first substrate with increasing the pixel region.

The electrical conduction between the first substrate and the second substrate is realized by a conductive material including a conductive paste provided between a first conductive terminal provided on the first substrate and a portion of the common electrode formed on one surface of the second substrate, which is opposite to the first conductive terminal.

In the embodiment including the first conductive terminal, the alignment mark may be provided in two diagonal corner regions among the four corner regions one by one, and the first conductive terminal may be provided in two corner regions different from the two corner regions, in which the alignment mark is provided, among the four corner regions, one by one.

In this case, it is possible to align the first and second substrates with high precision by two alignment marks provided in two diagonal corner regions.

In addition, it is possible to make the first and second substrates conductive with more certainty by two first conductive terminals provided in two corner regions different from the two corner regions in which the alignment marks are provided. That is, compared with the case where one first conductive terminal is provided in only one corner region among the four corner regions, since the first conductive terminal is redundantly provided, it is possible to make the first and second substrates conductive with more certainty.

The electro-optical device may further include a second conductive terminal which is provided in the corner region, in which the alignment mark is provided, among the four corner regions of the first substrate, and makes the first and second substrates conductive.

According to this configuration, it is possible to arrange the alignment mark and the second conductive terminal on the first substrate with narrowing the peripheral region. Alternatively, it is possible to arrange the alignment mark and the first conductive terminal on the first substrate with increasing the pixel region.

The electrical conduction between the first substrate and the second substrate is realized by a conductive material including a conductive paste provided between a second conductive terminal provided on the first substrate and a portion of the common electrode formed on one surface of the second substrate, which is opposite to the second conductive terminal.

In the embodiment including the second conductive terminal, the alignment mark may be provided in the four corner regions one by one.

In this case, it is possible to align the first and second substrates with high precision by four alignment marks provided in four diagonal corner regions provided in the four corner regions and make the first and second substrate conductive with more certainty by four second conductive terminals provided in the four corner regions.

The electronic apparatus of the invention includes the electro-optical device (including various embodiments) of the invention, in order to solve the above-described problem.

According to the electronic apparatus, since the electro-optical device of the invention is included, various electronic apparatuses such as a projection display device, a television set, a cellular phone, an electronic organizer, a word processor, a viewfinder-type or direct-view monitor type video tape recorder, a workstation, a videophone, a POS terminal, and a touch-panel-equipped device, which are capable of performing a high-quality image display and realizing downsizing can be realized. As the electronic apparatus of the invention, for example, an electrophoretic apparatus such as an electronic paper, a field emission display and a conduction electron-emitter display, and a display apparatus using the electrophoretic apparatus and the field emission display can be realized.

The operation and other advantages of the invention will be made clear from the description of embodiments below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. In the following embodiments, a TFT active matrix driving type liquid crystal device including a driving circuit therein, which is an example of an electro-optical device according to the invention, will be described.

First Embodiment

A liquid crystal device according to a first embodiment of the invention will be described with reference to FIGS. 1 to 7.

Figure 1:
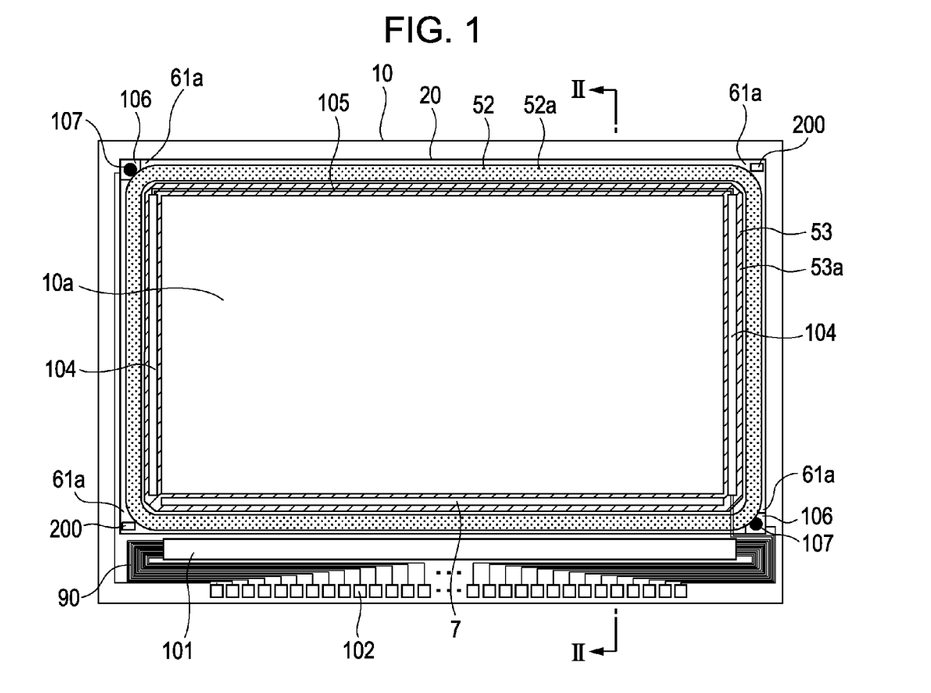
FIG. 1 is a plan view showing the overall configuration of a liquid crystal device according to a first embodiment of the invention.
Figure 2:
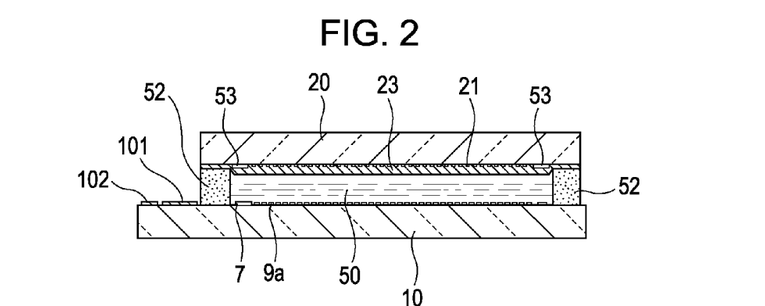
FIG. 2 is a cross-sectional view taken along line II-II of FIG. 1.

First, the overall configuration of the liquid crystal device according to the present embodiment will be described with reference to FIGS. 1 and 2. FIG. 1 is a plan view showing the overall configuration of a liquid crystal device according to a first embodiment of the invention. FIG. 2 is a cross-sectional view taken along line II-II of FIG. 1.

In FIGS. 1 and 2, the liquid crystal device according to the present embodiment includes a TFT array substrate 10 and a counter substrate 20 which face each other. Each of the TFT array substrate 10 and the counter substrate 20 has a rectangular shape. A liquid crystal layer 50 is sandwiched between the TFT array substrate 10 and the counter substrate 20, and the TFT array substrate 10 and the counter substrate 20 are bonded to each other by a seal material 52 provided in a seal region 52a located at the periphery of an image display region 10a which is an example of a "pixel region" according to the invention.

The seal material 52 is formed of ultraviolet curing resin or thermosetting resin for bonding the both substrates, which is coated on at least one of the TFT array substrate 10 and the counter substrate 20 and is cured by irradiating a ultraviolet ray or performing heating treatment in a manufacturing process. In the seal material 52, gap material for holding a gap between the TFT array substrate 10 and the counter substrate 20 at a predetermined value, such as glass fiber or glass beads, is dispersed.

In FIG. 1, a frame light-shielding film 53 defining a frame region 53a of the image display region 10a is provided on the counter substrate 20 on the inside of the seal region 52a in which the seal material 52 is provided. A portion or the whole of the frame light-shielding film 53 may be provided on the TFT array substrate 10 as a built-in light-shielding film. The frame region 53a in which the frame light-shielding film 53 is formed has a rectangular frame shape on the TFT array substrate in plan view.

In the present embodiment, a peripheral region defining the periphery of the image display region 10a exists. In other words, in the present embodiment, a region located farther from the TFT array substrate 10 than the frame light-shielding film 53 is the peripheral region.

In a region located outside the seal region 52a in the peripheral region, a data line driving circuit 101 and an external circuit connection terminal 102 are provided along one side of the TFT array substrate 10. A sampling circuit 7 is provided inside the seal region 52a along one side so as to cover the frame light-shielding film 53. Scan line driving circuits 104 are provided inside the seal region 52a along two sides adjacent to one side so as to cover the frame light-shielding film 53. In order to connect the two scan line driving circuits 104 provided at the both sides of the image display region 10a, a plurality of wires 105 are provided along the remaining side of the TFT array substrate 10 so as to cover the frame light-shielding film 53. On the TFT array substrate 10, upper/lower conductive terminals 106 for connecting the both substrates via upper/lower conductive materials 107 are provided in two corner regions 61a which are located at two diagonal corner regions 61a among four corner regions 61a which face four corners of the counter substrate 20. Accordingly, the TFT array substrate 10 and the counter substrate 20 are electrically conducted. The upper/lower conductive terminals 106 are an example of a "first conductive terminal" according to the invention.

In two corner regions 61a different from the corner regions 61a, in which the upper/lower conductive terminals 106 are provided, among the four corner regions 61a, alignment marks 200 are provided. The positions and the detailed configuration of the alignment marks 200 will be described in detail later. By the alignment marks 200, in the process of manufacturing the liquid crystal device according to the present embodiment, when the TFT array substrate 10 and the counter substrate 20 are bonded to each other by the seal material 52, the TFT array substrate 10 and the counter substrate 20 are aligned.

On the TFT array substrate 10, routed wires 90 for electrically connecting the external circuit connection terminal 102, the data line driving circuit 101, the scan line driving circuits 104 and the upper/lower conductive terminals 106 are formed.

In FIG. 2, on the TFT array substrate 10, a laminated structure made of wires such as pixel switching TFTs which are driving elements, scan lines and data lines is formed. Although the detailed configuration of the laminated structure is not shown in FIG. 2, pixel electrodes 9a made of a transparent material such as indium tin oxide (ITO) are provided on the laminated structure in a matrix. An alignment film is formed on the pixel electrodes 9a.

Meanwhile, a light-shielding film 23 is provided on a surface of the counter substrate 20 opposite to the TFT array substrate 10. The light-shielding film 23 is formed of, for example, a light-shielding metal film and is, for example, patterned on the counter substrate 20 in a lattice shape in the image display region 10a. In the counter substrate 20, a non-opening region is defined by the light-shielding film 23 and a region divided by the light-shielding film 23 becomes an opening region which transmits the light emitted from a direct-view backlight or a projector lamp. The light-shielding film 23 is formed in a stripe shape and the non-opening region may be defined by the light-shielding film 23 and various types of components such as the data lines provided on the TFT array substrate 10.

A counter electrode 21 formed of a transparent material such as ITO is solidly formed on the light-shielding film 23 so as to be opposite to the plurality of pixel electrodes 9a. A color filter which is not shown in FIG. 2 may be formed on the light-shielding film 23 in a region including a portion of the opening region and the non-opening region in the image display region 10a in order to perform a color display. An alignment film is formed on the counter electrode 21.

The liquid crystal layer 50 is formed of one type or several types of nematic liquid crystal and is in a predetermined alignment state between the alignment film on the pixel electrode 9a and the alignment film on the counter electrode 21.

Although not shown herein, a test circuit or a test pattern for testing the quality and the defect of the liquid crystal device during manufacturing or before shipment may be formed on the TFT array substrate 10, in addition to the data line driving circuit 101 and the scan line driving circuits 104.

Figure 3:
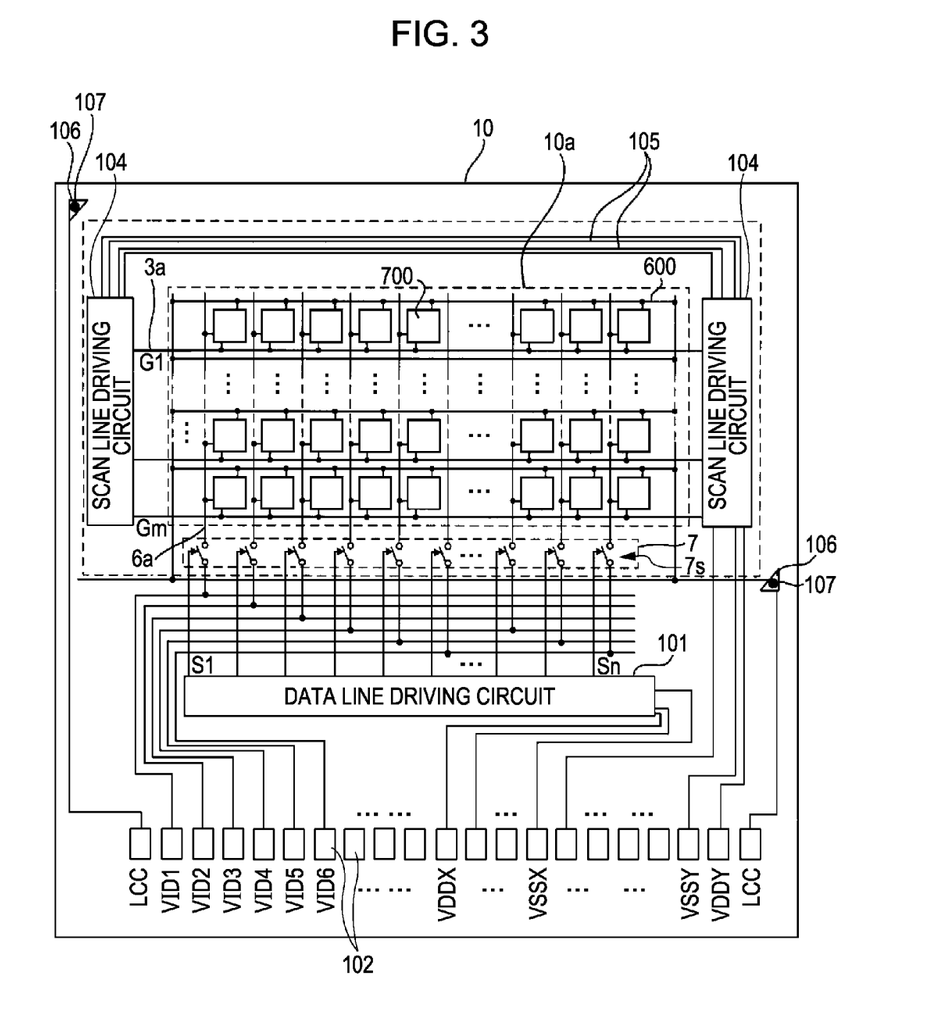
FIG. 3 is a block diagram showing the configuration of main portions of the liquid crystal device according to the first embodiment of the invention.
Figure 4:
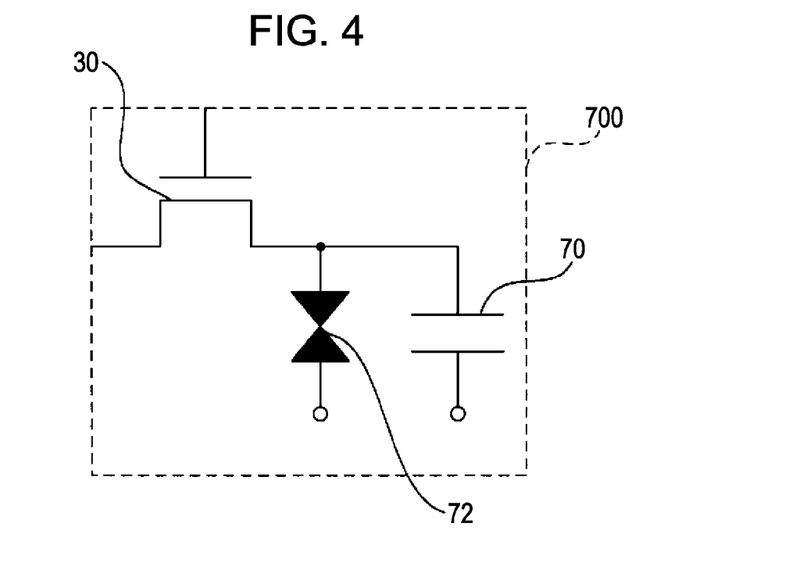
FIG. 4 is a block diagram showing the electrical configuration of a pixel unit of the liquid crystal device according to the first embodiment of the invention.

Next, the electrical configuration of the liquid crystal device according to the present embodiment will be described with reference to FIGS. 3 and 4. FIG. 3 is a block diagram showing the configuration of main portions of the liquid crystal device according to the present embodiment. FIG. 4 is a block diagram showing the electrical configuration of a pixel unit.

In FIG. 3, the liquid crystal device according to the present embodiment includes the driving circuits such as the scan line driving circuits 104, the data line driving circuit 101 and the sampling circuit 7 in the peripheral region located at the periphery of the image display region 10a of the TFT array substrate 10.

As shown in FIG. 3, various types of control signals such as a Y clock signal CLY (and an inverted Y clock signal CLY'), a Y start pulse signal or the like are supplied from an external circuit to the scan line driving circuits 104 via the external circuit connection circuit 102. The scan line driving circuits 104 sequentially generate and output scan signals G1, . . . and Gm to the scan lines 3a on the basis of the control signals. Powers VDDY and VSSY for driving the scan line driving circuits 104 or various types of control signals are supplied to the scan line driving circuits 104 via the external circuit connection terminal 102. The potential of the power VDDY for the scan line driving circuits is set to be higher than that of the power VSSY for the scan line driving circuits.

In FIG. 3, an X clock signal and an X start pulse are supplied from the external circuit to the data line driving circuit 101 via the external circuit connection terminal 102. When the X start pulse is received, the data line driving circuit 101 sequentially generates and outputs sampling signals S1, . . . and Sn at timings based on the X clock signal. Powers VDDX and VSSX for driving the data line driving circuit 101 or various types of control signals are supplied to the data line driving circuit 101 via the external circuit connection terminal 102. The potential of the VDDX for the data line driving circuit is set to be higher than that of the power VSSX for the data line driving circuit.

The sampling circuit 7 includes a plurality of sampling switches 7s constituted by P-channel type or N-channel type TFTs or complementary TFTs.

In FIG. 3, in the liquid crystal device according to the present embodiment, a plurality of pixel units 700 arranged in a matrix are provided in the image display region 10a which is formed in the central portion of the TFT array substrate.

As shown in FIG. 4, each of the pixel units 700 includes a pixel switching TFT 30, a liquid crystal element 72 and a storage capacitor 70.

The source of the TFT 30 is electrically connected to the data line 6a, the gate thereof is electrically connected to the scan line 3a, and the drain thereof is electrically connected to the pixel electrode 9a of the liquid crystal element 72. The ON/OFF of pixel switching TFT 30 is switched by the scan signal supplied from the scan line driving circuit 104.

The liquid crystal element 72 includes a pixel electrode 9a, the counter electrode 21 and the liquid crystal sandwiched between the pixel electrode 9a and the counter electrode 21. In the liquid crystal element 72, an image signal having a predetermined level, which is written to the liquid crystal via the data line 6a and the pixel electrode 9a, is held between the counter electrode 21 and the pixel electrode for a predetermined period. Alignment or the order of the liquid crystal molecules is changed by the level of the applied voltage so as to modulate the light, thereby realizing a gradation display. The transmissivity of the incident light is decreased according to the applied voltage in the units of the pixels in a normally-white mode and is increased according to the applied voltage in the units of the pixels in a normally-black mode such that the light having contrast according to the image signal is emitted from the electro-optical device.

The storage capacitor 70 is provided in parallel with the liquid crystal capacitor which is formed between the pixel electrode 9a and the counter electrode in order to prevent the held image signal from being leaked. One electrode of the storage capacitor 70 is electrically connected to the drain of the TFT 30 in parallel with the pixel electrode 9a and the other electrode thereof is electrically connected to a capacitive wire 600 (see FIG. 3) so as to become a constant potential. In the present embodiment, the capacitive wire 600 is electrically connected to the upper/lower conductive terminals 106 and a counter electrode potential LCC is supplied to the other electrode.

Since the pixel units 700 are arranged in the image display region 10a in a matrix, it is possible to realize active matrix driving.

As shown in FIG. 3, the image signals are supplied to a set of six data lines 6a in correspondence with the image signals VID1 to VID6 serial-parallel developed in six phases. The phase development number of the image signals (that is, the number of image signals serial-parallel developed) is not limited to six phases and the image signals developed in a plurality of phases such as 9 phase, 12 phases, 24 phases or the like may be supplied to a set of data lines 6a of the number corresponding to the development number. Instead of the serial-parallel development, the image signals may be line-sequentially supplied to the data lines 6a.

In FIG. 3, the counter electrode potential LCC is supplied from the external circuit to the upper/lower conductive terminals 106 via the external circuit connection terminal 102. The upper/lower conductive materials 107 including a conductive paste is placed at positions corresponding to the upper/lower conductive terminals 106 between the counter substrate 20 and the TFT array substrate 10. The counter electrode potential LCC is supplied from the upper/lower conductive terminals 106 to the counter electrode 21 via the upper/lower conductive materials 107. The counter electrode potential LCC appropriately holds a potential difference with the pixel electrode 9a so as to become the reference potential of the counter electrode 21 for forming liquid crystal holding capacitance.

Figure 5:
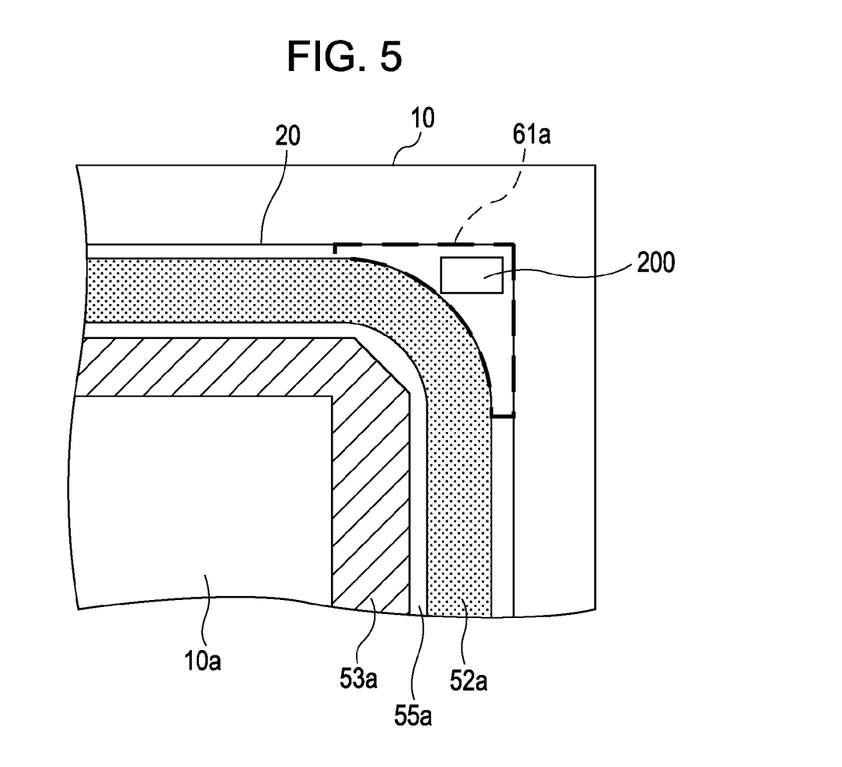
FIG. 5 is a view showing the position of an alignment mark in the liquid crystal device according to the first embodiment of the invention.
Figure 6:
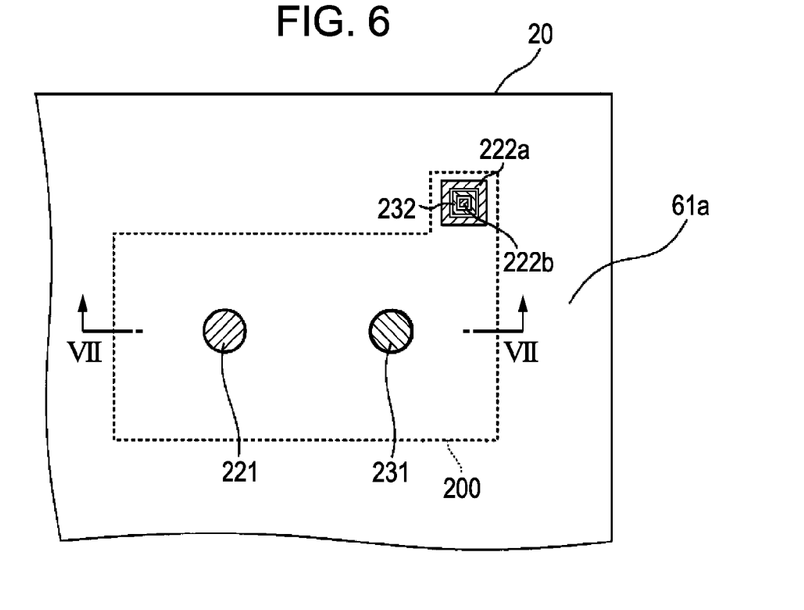
FIG. 6 is a plan view showing the detailed configuration of the alignment mark in the liquid crystal device according to the first embodiment of the invention.
Figure 7:
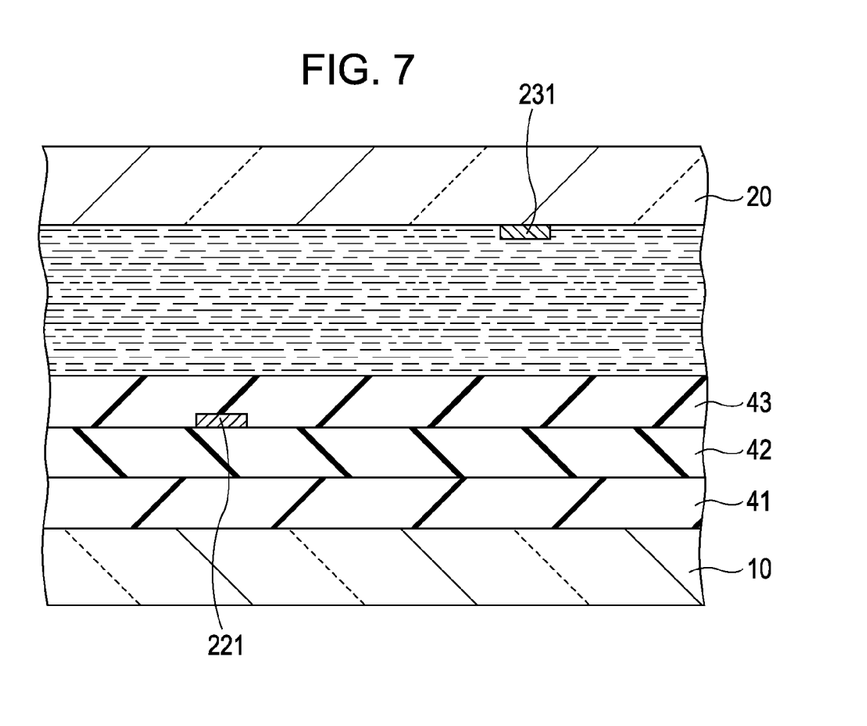
FIG. 7 is a cross-sectional view taken along line VII-VII of FIG. 6.

Next, the alignment mark of the liquid crystal device according to the present embodiment will be described with reference to FIGS. 1 and 5 to 7. FIG. 5 is a view showing the position of the alignment mark in the liquid crystal device according to the present embodiment. FIG. 6 is a plan view showing the detailed configuration of the alignment mark when viewed from the counter substrate side. FIG. 7 is a cross-sectional view taken along line VII-VII of FIG. 6. In FIGS. 5 to 7, for convenience of description, only components related to the alignment mark are shown and the other components are omitted. In FIG. 5, the alignment mark 200 provided in the upper right corner region 61a in FIG. 1 is shown.

First, as shown in FIGS. 1 and 5, the alignment marks 200 are provided in the two corner regions 61a different from the corner regions 61a, in which the upper/lower conductive terminals 106 are provided, among the four corner regions 61a.

As shown in FIG. 5, the corner regions 61a are positioned at the outer edge side of the counter substrate 20 rather than the seal region 52a, in which the seal material 52 is provided, and is partially defined by the edges of the counter substrate 20. Since it is difficult to completely dispose the seal material 52 along the outer edge of the counter substrate 20 when the seal material 52 is disposed so as to surround the image display region 10a in the process of manufacturing the liquid crystal device according to the present embodiment, the corner regions 61a are regions in which the seal material 52 is not provided (that is, which does not become the seal region 52a) and is a so-called a dead space. Four corner regions 61a are formed in correspondence with the four corners of the counter substrate 20.

Next, the detailed configuration of each of the alignment marks 200 will be described.

As shown in FIG. 6, the alignment mark 200 includes first alignment marks 221 and 231 for measuring an XY deviation amount and θ deviation amount and second alignment marks 222a, 222b, and 232 for measuring an assembling deviation amount.

As shown in FIG. 7, the first alignment mark 221 is formed on the TFT array substrate 10 and the first alignment mark 231 is formed on the counter substrate 20. The second alignment marks 222a and 222b are formed on the same layer as the layer on which the first alignment mark 221 on the TFT array substrate 10 is formed. The second alignment mark 232 is formed on the same layer as the layer on which the first alignment mark 231 on the counter substrate 20 is formed.

The first alignment mark 221 and the second alignment marks 222a and 222b are formed of aluminum. The first alignment mark 231 and the second alignment mark 232 are formed of an aluminum-chrome alloy or chrome.

In FIG. 7, interlayer insulating films 41, 42 and 43 are sequentially laminated on the TFT array substrate 10 from a lower layer side. The interlayer insulating films 41, 42 and 43 have a function for insulating the components such as the data lines 6a and the scan lines 3a formed on the TFT array substrate 10. The first alignment marks 221 and the second alignment marks 222a and 222b are formed on the interlayer insulating film 42.

In FIG. 5, in the present embodiment, in particular, the alignment mark 200 is provided in the corner region 61a which is the dead space. Accordingly, a region in which only the alignment mark 200 is disposed does not need to be provided in the peripheral region and thus the peripheral region can narrow.

Figure 8:
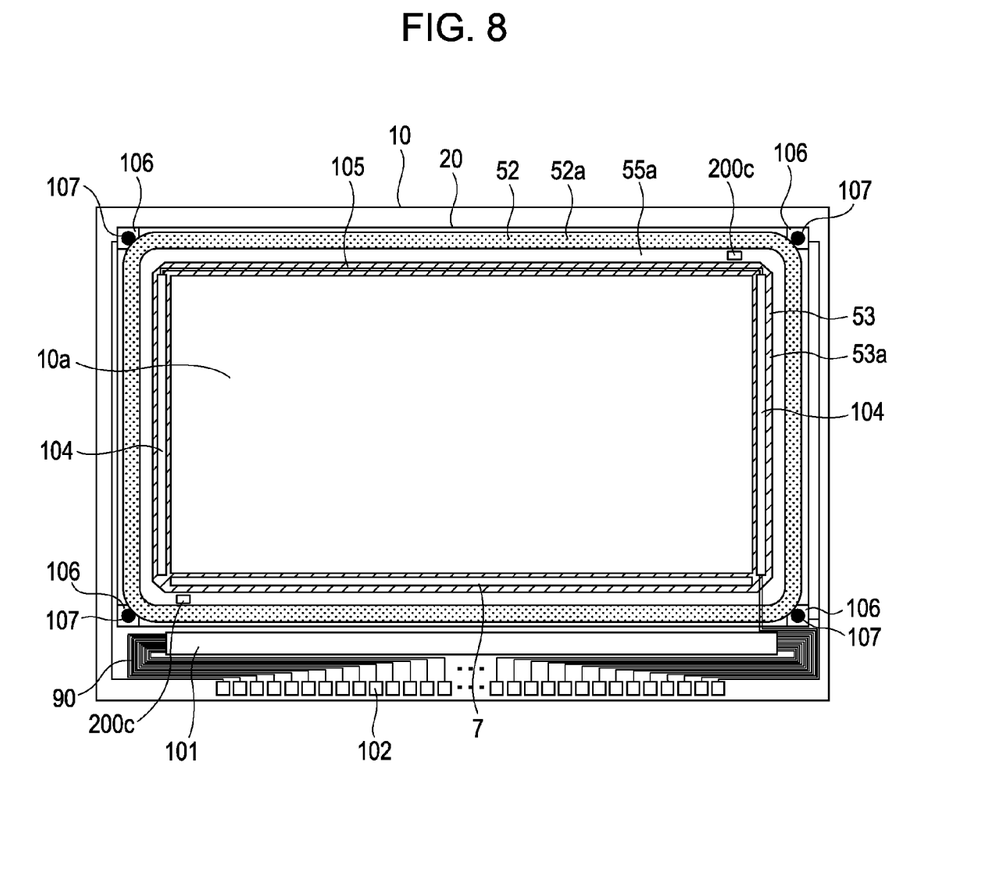
FIG. 8 is a plan view showing the overall configuration of a liquid crystal device according to a comparative example.

For example, as shown in FIG. 8 as a comparative example, compared with the case where an alignment mark 200c is provided in a gap region 55a which is located between the frame region 53a and the seal region 52a and is located on the inside of the seal region 52a, it is possible to increase the image display region 10a or narrow the gap region 55a of the peripheral region. FIG. 8 is a plan view showing the whole configuration of the liquid crystal device according to the comparative example. In FIG. 8, the same components as the first embodiment shown in FIGS. 1 to 7 are denoted by the same reference numerals.

The gap region 55a is provided in order to avoid a problem that the ultraviolet ray for curing the seal material 52 formed of, for example, the ultraviolet curing resin is blocked by the frame light-shielding film 53 and thus the seal material 52 cannot be cured by overlapping the frame region 53a with the seal region 52a in the process of manufacturing the liquid crystal device according to the present embodiment. Accordingly, from the viewpoint of the narrowness of the peripheral region, it is preferable that the gap region 55a is formed as small as possible according to a manufacturing tolerance of the seal material 52 and the frame light-shielding film 53.

Accordingly, according to the liquid crystal device of the present embodiment, the peripheral region of the liquid crystal device narrows with respect to the image display region 10a and thus the liquid crystal device can be downsized without narrowing the image display region 10a. That is, the percentage of the image display region 10a in the liquid crystal device can be increased and thus a high-quality image display can be performed. Instead or in addition, the liquid crystal device can be downsized. In particular, by this configuration, in a manufacturing process of bonding a first mother substrate which becomes a plurality of TFT array substrates 10 and a second mother substrate which becomes a plurality of counter substrates 20 so as to form a plurality of liquid crystal devices according to the present embodiment and separately cutting the liquid crystal devices, more liquid crystal devices can be formed in the same area. In the case where several or several tens of liquid crystal devices are manufactured on the same mother substrate, for example, if the sizes of the TFT array substrate 10 and the counter substrate 20 are slightly reduced by several tenths mm or several mm, more liquid crystal devices can be formed on the same mother substrate by one column or a plurality of columns or one row or a plurality of rows. Accordingly, it is possible to reduce or suppress manufacturing cost of the liquid crystal device.

Referring to FIG. 1 again, in the present embodiment, in particular, the upper/lower conductive terminals 106 are provided in the corners region 61a different the corner regions 61a in which the alignment marks 200 are provided, among the four corner regions 61a of the TFT array substrate 10. That is, similar to the alignment marks 200, since the upper/lower conductive terminals 106 are provided in the corner regions 61a which is the dead space, the upper/lower conductive terminals 106 and the alignment marks 200 can be provided on the TFT array substrate 10 with narrowing the peripheral region. Alternatively, the upper/lower conductive terminals 106 and the alignment marks 200 can be provided on the TFT array substrate 10 with increasing the image display region 10a.

In FIG. 1, in the present embodiment, in particular, the alignment marks 200 are provided in the two diagonal corner regions 61a (that is, the upper right corner region 61a and the lower left corner region 61a in FIG. 1) among the four corner regions 61a one by one, and the upper/lower conductive terminals 106 are provided in the two corner regions 61a (that is, the upper left corner region 61a and the lower right corner region 61a in FIG. 1) different from the two corner regions 61a, in which the alignment marks 200 are provided, among the four corner regions 61a one by one. Accordingly, it is possible to align the TFT array substrate 10 and the counter substrate 20 with high precision by the two alignment marks 200 provided in the two diagonal corner regions 61a. In addition, it is possible to make the TFT array substrate 10 and the counter substrate 20 conductive with more certainty by the two upper/lower conductive terminals 106 provided in the two other diagonal corner regions 61a. That is, compared with the case where one upper/lower conductive terminals 106 is provided in one corner region 61a of the four corner regions 61a, it is possible to make the TFT array substrate 10 and the counter substrate 20 conductive with more certainty by redundantly providing the upper/lower conductive terminals 106 (and the upper/lower conductive materials 107).

Figure 9:
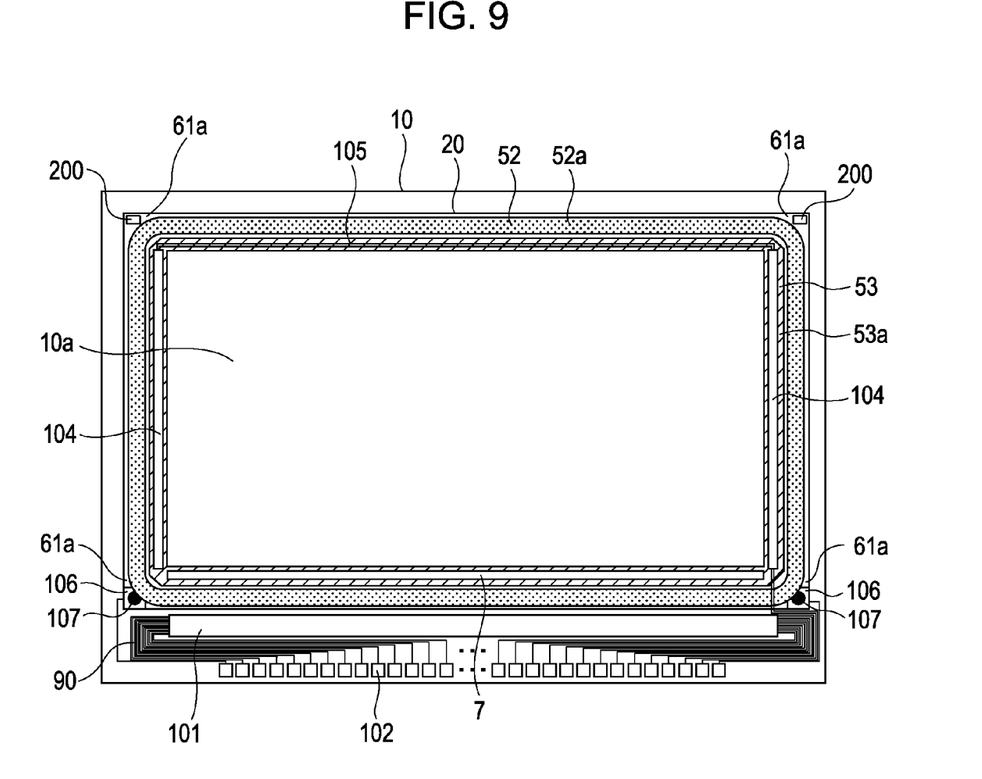
FIG. 9 is a plan view showing the overall configuration of a liquid crystal device according to a modified example of the first embodiment of the invention.

FIG. 9 is a plan view showing the whole configuration of the liquid crystal device according to a modified example of the present embodiment.

As shown in FIG. 9 as the modified example, the alignment marks 200 may be provided in the two corner regions 61a (that is, the upper left corner region 61a and the upper right corner region 61a in FIG. 9) located at the both ends of one side of the counter substrate 20 among the four corner regions 61a one by one, and the upper/lower conductive terminals 106 may be provided in the two corner regions 61a (that is, the lower left corner region 61a and the lower right corner region 61a in FIG. 9) different from the two corner regions 61a, in which the alignment marks 200 are provided, among the four corner regions 61a one by one. Even in this case, it is possible to align the TFT array substrate 10 and the counter substrate 20 with high precision by the two alignment marks 200 provided in the two diagonal corner regions 61a and make the TFT array substrate 10 and the counter substrate 20 conductive with more certainty by the two upper/lower conductive terminals 106 provided in the two other diagonal corner regions 61a.

If at least one alignment marks 200 and at least one upper/lower conductive terminals 106 are provided in the liquid crystal device according to the present embodiment, it is possible to align the TFT array substrate 10 and the counter substrate 20 by the two alignment marks 200 and make the TFT array substrate 10 and the counter substrate 20 conductive by the two upper/lower conductive terminals 106. At this time, by arranging the alignment marks 200 and the upper/lower conductive terminals 106 in the corner regions 61a, the peripheral region of the liquid crystal device can narrow with respect to the image display region 10a and thus the liquid crystal device can be downsized without narrowing the image display region 10a.

As described above, according to the liquid crystal device of the present embodiment, since the alignment marks 200 are provided in the corner regions 61a, it is possible to perform a high-quality image display and downsize the liquid crystal device.

Second Embodiment

Figure 10:
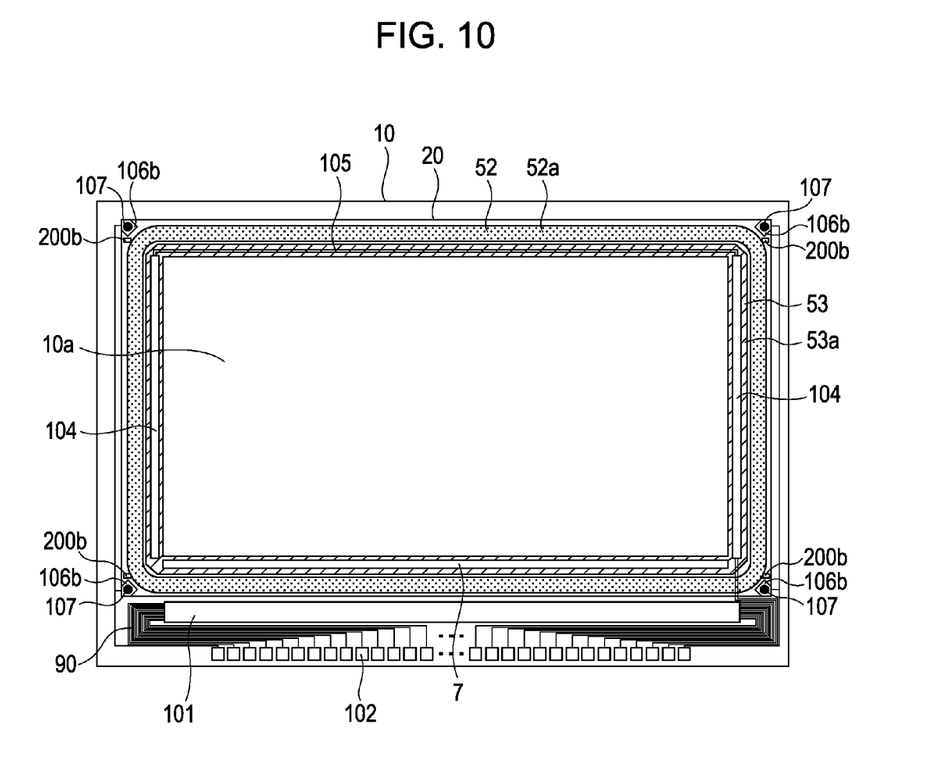
FIG. 10 is a plan view showing the overall configuration of a liquid crystal device according to a second embodiment of the invention.
Figure 11:
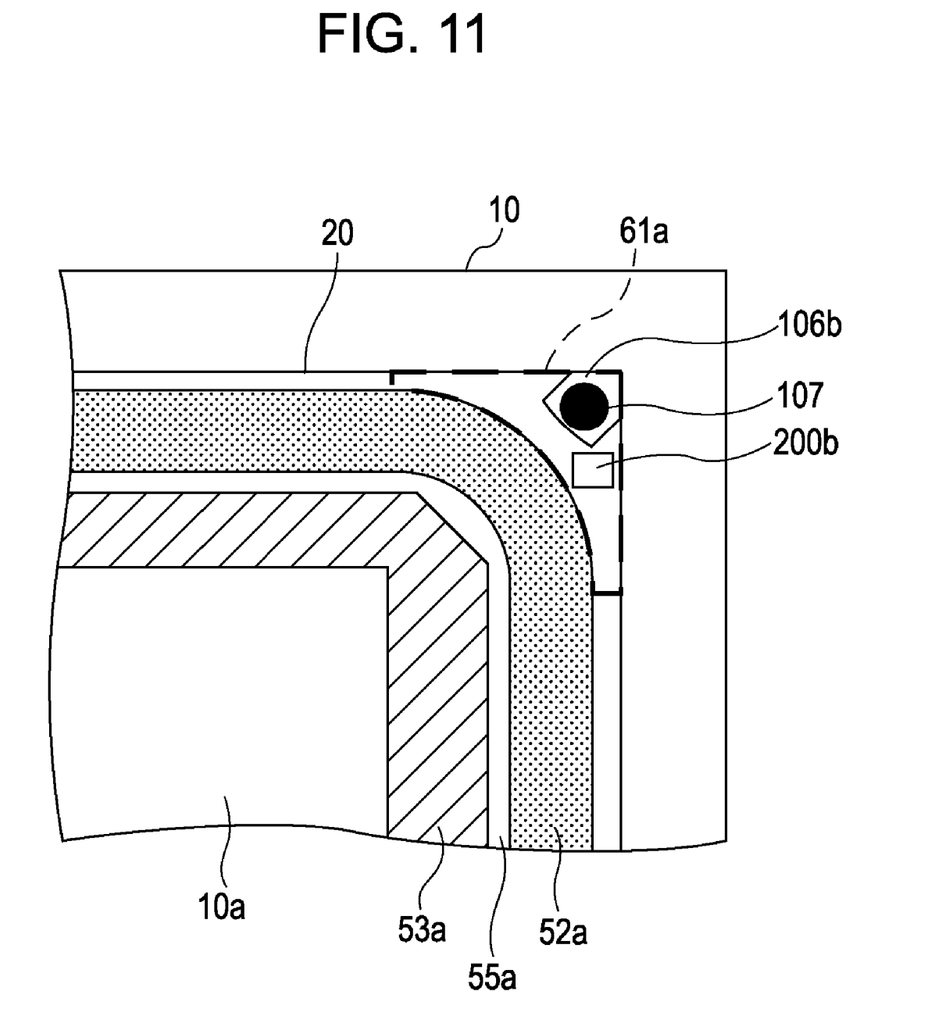
FIG. 11 is a view showing the positions of alignment marks in the liquid crystal device according to the second embodiment of the invention.

Next, a liquid crystal device according to a second embodiment will be described with reference to FIGS. 10 and 11. FIG. 10 is a plan view showing the whole configuration of the liquid crystal device according to the second embodiment. FIG. 11 is a view showing the positions of the alignment marks in the liquid crystal device according to the second embodiment. In FIGS. 10 and 11, the same components as the first embodiment shown in FIGS. 1 to 7 are denoted by the same reference numerals and the description thereof will be properly omitted.

In FIG. 10, the liquid crystal device according to the second embodiment is different from the liquid crystal device according to the first embodiment in that upper/lower conductive terminals 106b and alignment marks 200b are included instead of the upper/lower conductive terminals 106 and the alignment marks 200 of the first embodiment and is similar to the liquid crystal device according to the first embodiment in other points. The upper/lower conductive terminals 106b are an example of a second conductive terminal of the invention.

In FIGS. 10 and 11, in the present embodiment, in particular, the alignment marks 200b and the upper/lower conductive terminals 106b are provided in the four corner regions 61a. The alignment marks 200b and the upper/lower conductive terminals 106b are provided in the same corner region 61a one by one. The alignment marks 200b are different from the alignment marks 200 according to the first embodiment in the arrangement and the size, but are equal to the alignment marks 200 in the detailed configuration.

Accordingly, the regions in which the alignment marks 200b are provided do not need to be ensured in the peripheral region and thus the peripheral region can narrow. That it, similar to the liquid crystal device according to the first embodiment, compared with the liquid crystal device according to the comparative example shown in FIG. 8, it is possible to increase the image display region 10a and narrow the gap region 55a in the peripheral region. Accordingly, according to the liquid crystal device of the second embodiment, it is possible to narrow the peripheral region of the liquid crystal device with respect to the image display region 10a and downsize the liquid crystal device without narrowing the image display region 10a. That is, it is possible to perform a high-quality image display and downsize the liquid crystal device.

In the present embodiment, in particular, the alignment marks 200b and the upper/lower conductive terminals 106 are provided in the four corner regions 61a one by one. Accordingly, it is possible to align the TFT array substrate 10 and the counter substrate 20 with high precision by the four alignment marks 200b and make the TFT array substrate 10 and the counter substrate 20 conductive by the four upper/lower conductive terminals 106b provided in the four corner regions 61a.

Electronic Apparatus

Figure 12:
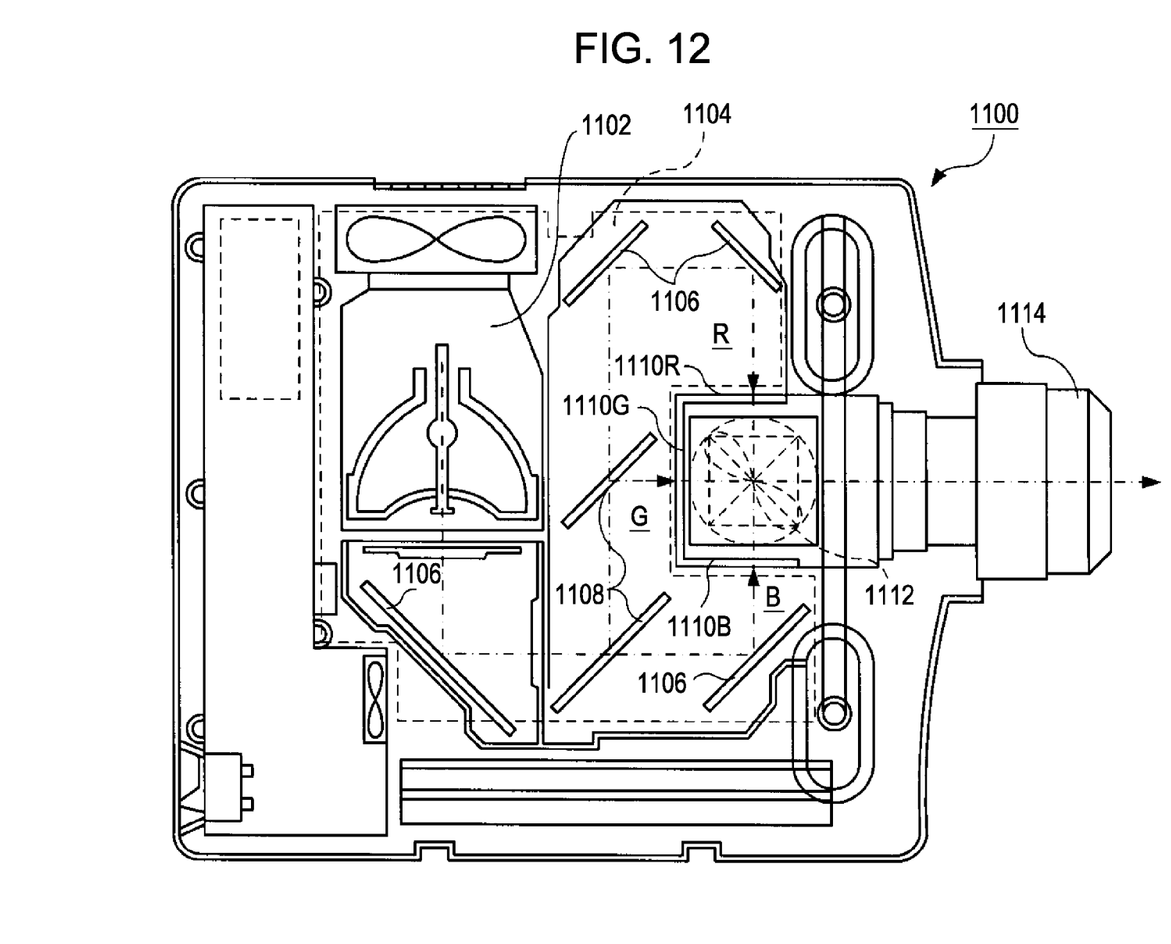
FIG. 12 is a plan view showing the configuration example of a projector which is an example of an electronic apparatus according to the invention.

Next, the case of applying the above-described liquid crystal device to a projector which is an example of the electronic apparatus will be described with reference to FIG. 12. FIG. 12 is a plan view showing the configuration example of the projector. The above-described liquid crystal device is used as a light valve of the projector.

As shown in FIG. 12, a lamp unit 1102 formed of a white light source such as a halogen lamp is provided in the projector 1100. The light emitted from the lamp unit 1102 is divided into three primary colors of RGB by four mirrors 1106 and two dichroic mirrors 1108 provided in a light guide 1104 and is made incident to liquid crystal panels 1110R, 1110B and 1110G as the light valves corresponding to the primary colors.

The configurations of the liquid crystal panels 1110R, 1110B and 1110G are equal to that of the above-described liquid crystal device and the liquid crystal panels are driven by the primary color signals of R, G and B supplied from an image signal processing circuit. The lights modulated by the liquid crystal panels are made incident to a dichroic prism 1112 in three directions. In the dichroic prism 1112, the lights of R and B are refracted by 90 degrees and the light of G goes straight. Accordingly, the images of the colors are synthesized such that a color image is projected onto a screen via a projection lens 1114.

Here, the display images of the liquid crystal panels 1110R, 1110B and 1110G, the display image of the liquid crystal panel 1110G is horizontally reversed with respect to the display images of the liquid crystal panels 1110R and 1110B.

Since the lights corresponding to the primary colors of R, G and B are made incident to the liquid crystal panels 1110R, 1110B and 1110G by a dichroic mirror 1108, a color filter does not need to be provided.

In addition to the electronic apparatus described in FIG. 12, there are a mobile personal computer, a cellular phone, a liquid crystal television set, a viewfinder-type or direct-view monitor type video tape recorder, a car navigation system, a pager, an electronic organizer, an electronic calculator, a word processor, a workstation, a videophone, a POS terminal, and a touch-panel-equipped device. The invention is applicable to various electronic apparatuses.

The invention is applicable to a reflective type liquid crystal device (LCOS) in which an element is formed on a silicon substrate, a plasma display panel (PDP), an field emission display (FED or SED), an organic EL display, a digital micro-mirror device (DMD) and an electrophoretic apparatus, in addition to the liquid crystal device described in the above-described embodiments.

The invention is not limited to the above-described embodiments and may be modified without departing from the scope of the invention which can be read from claims or specification. A modified electro-optical device and an electronic apparatus including the electro-optical device are included in the technical range of the invention.

What is claimed is:

1. An electro-optical device comprising:
a first substrate;
pixel electrodes formed above the first substrate within a pixel region;
a second substrate;
a seal material, which is formed in a sealing region outside of the pixel region, bonding the first substrate and the second substrate;
a counter electrode formed above the second substrate, the counter electrode being opposite to the pixel electrode at the pixel region and extending beyond the sealing region;
a first conductive terminal formed above the first substrate and electrically connected to the counter electrode, the first conductive terminal disposed in a first corner region among four corner regions, the four corner regions being outside of both the pixel region and the sealing region and the four corner regions being between the first substrate and the second substrate; and a first alignment mark disposed in the first corner region, the first alignment mark being disposed between the first conductive terminal and the seal material.

2. The electro-optical device according to claim 1, further comprising a second conductive terminal, a third conductive terminal, a fourth conductive terminal, a second alignment mark, a third alignment mark, and a fourth alignment mark, the second conductive terminal and the second alignment mark being disposed in a second corner region among the four corner regions, the third conductive terminal and the third alignment mark being disposed in a third corner region among the four corner regions, and the fourth conductive terminal and the fourth alignment mark being disposed in a fourth corner region among the four corner regions, wherein each of the second alignment mark, third alignment mark and fourth alignment mark are disposed between the first conductive terminal and the seal material.

3. The electro-optical device according to claim 1, the first conductive terminal being disposed in a first corner region among the four corner regions, the first alignment mark being disposed in a second corner region among the four corner regions.

4. The electro-optical device according to claim 3, further comprising a second conductive terminal, and a second alignment mark, the second conductive terminal being disposed in a third corner region among the four corner regions, the first corner region and the third corner region being diagonal corner region, the second alignment mark being disposed in a fourth corner region among the four corner regions, and the second corner region and the fourth corner region being diagonal corner region.

5. The electro-optical device according to claim 3, further comprising a second conductive terminal, and a second alignment mark, the second conductive terminal being disposed in a third corner region among the four corner regions, the first corner region and the third corner region being located at both ends of one side of the second substrate respectively, the second alignment mark being disposed in a fourth corner region among the four corner regions, and the second corner region and the fourth corner region being located at both ends of other side of the second substrate respectively.

6. An electronic apparatus comprising the electro-optical device according to claim 1.

7. The electro-optical device according to claim 1, wherein the conductive terminal has an irregular pentagon shape.

8. An electro-optical device comprising:
a first substrate;
pixel electrodes formed above the first substrate within a pixel region;
a second substrate;
a seal material, which is formed in a sealing region outside of the pixel region, bonding the first substrate and the second substrate,;

a counter electrode formed above the second substrate, the counter electrode being opposite to the pixel electrode at the pixel region and extending beyond the sealing region;

a first conductive terminal formed above the first substrate and electrically connected to the counter electrode, the first conductive terminal disposed in four corner regions, the four corner regions being outside of both the pixel region and the sealing region and the four corner regions being between the first substrate and the second substrate; and an first alignment mark comprising an aluminum material disposed in the first corner region, the first alignment mark being disposed between the first conductive terminal and the seal material.

9. The electro-optical device according to claim 8, further comprising a second conductive terminal, a third conductive terminal, a fourth conductive terminal, a second alignment mark, a third alignment mark, and a fourth alignment mark, the second conductive terminal and the second alignment mark being disposed in a second corner region among the four corner regions, the third conductive terminal and the third alignment mark being disposed in a third corner region among the four corner regions, and the fourth conductive terminal and the fourth alignment mark being disposed in a fourth corner region among the four corner regions, wherein each of the second alignment mark, third alignment mark and fourth alignment mark are disposed between the first conductive terminal and the seal material.

10. The electro-optical device according to claim 8, the first conductive terminal being disposed in a first corner region among the four corner regions, the first alignment mark being disposed in a second corner region among the four corner regions.

11. The electro-optical device according to claim 10, further comprising a second conductive terminal, and a second alignment mark, the second conductive terminal being disposed in a third corner region among the four corner regions, the first corner region and the third corner region being diagonal corner region, the second alignment mark being disposed in a fourth corner region among the four corner regions, and the second corner region and the fourth corner region being diagonal corner region.

12. The electro-optical device according to claim 10, further comprising a second conductive terminal, and a second alignment mark, the second conductive terminal being disposed in a third corner region among the four corner regions, the first corner region and the third corner region being located at both ends of one side of the second substrate respectively, the second alignment mark being disposed in a fourth corner region among the four corner regions, and the second corner region and the fourth corner region being located at both ends of other side of the second substrate respectively.

13. An electronic apparatus comprising the electro-optical device according to claim 8.

14. The electro-optical device according to claim 8, wherein the conductive terminal has an irregular pentagon shape.

* * * * *